July 2, 1935.  L. F. KNUST  2,007,055

DEVICE FOR TEACHING CARD PLAYING

Filed Aug. 12, 1932  2 Sheets-Sheet 1

Inventor
Leo F. Knust,

July 2, 1935.  L. F. KNUST  2,007,055
DEVICE FOR TEACHING CARD PLAYING
Filed Aug. 12, 1932  2 Sheets-Sheet 2
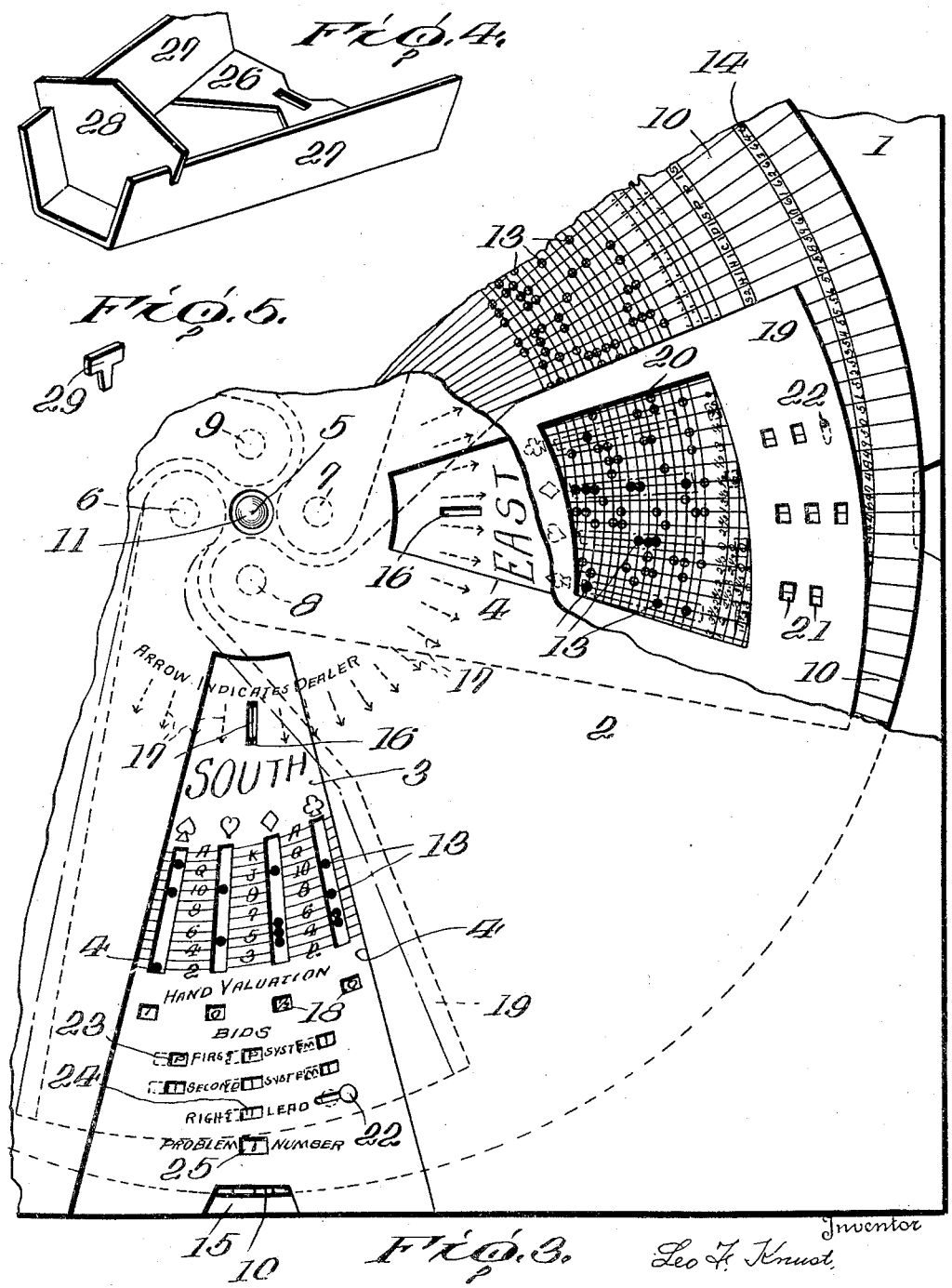
Inventor
Leo F. Knust
By
Attorneys.

Patented July 2, 1935

2,007,055

UNITED STATES PATENT OFFICE 2,007,055

DEVICE FOR TEACHING CARD PLAYING

Leo F. Knust, New York, N. Y.

Application August 12, 1932, Serial No. 628,595

7 Claims. (Cl. 35—8)

The invention relates to new and useful improvements in a device or apparatus for instructions in valuing and bidding in a card game.

An object of the invention is to provide a device whereby a card hand may be displayed with which is associated the standard values of the cards in each suit.

A further object of the invention is to provide a device of the above character with means whereby the values of the cards in the respective suits may be temporarily concealed from view.

A still further object of the invention is to provide a device of the above character wherein all the hands to be played are simultaneously displayed, and wherein, by the shifting of a movable member, new sets of hands may be displayed, wherein the different characters assume different denominational values.

In the drawings which show by way of illustration one embodiment of the invention—

Fig. 3 is an enlarged view of a portion of the device with parts broken away to show the inner structure;

Fig. 4 is a perspective view of a hood which may be used to conceal a displayed hand from the view of the other players; and Fig. 5 is a perspective view of a clip which may be attached to a table for indicating the playing of a card.

The invention has to do with a device for instructing a card player in valuing the cards held in this hand for formulating a bid thereon. It includes a supporting base on which is mounted a table provided with slots. There are four slots which are grouped at the position of each player, and each slot represents a suit, and displays therethrough the cards in the suit. Between the table and the base is a movable disk carrying symbols which are in the form of dots and these dots are exposed to view through the slots in the table and when so exposed they indicate the cards held in each suit and the value thereof. This is accomplished by providing the table with a series of lines which intersect the slots and associated with the lines are characters which indicate the value of the card in the suit. When the dot on the disk appears in the slot opposite a given line, it indicates a card of value designated by the line. Between the disk and the table is a shutter which may be positioned so as to expose to view the values through the openings provided therefor, and which can also be shifted so as to close the openings and conceal from view temporarily the values, although the cards held in the suit are exposed to view so that the player may determine for himself the values of the cards and the bid to be made thereon. Not only is there an opening through which is displayed the values of the suits in each hand, but there is also an opening through which is brought to view the standard bid on the hand displayed. This may also be concealed temporarily by the shutter referred to.

Figure 1:
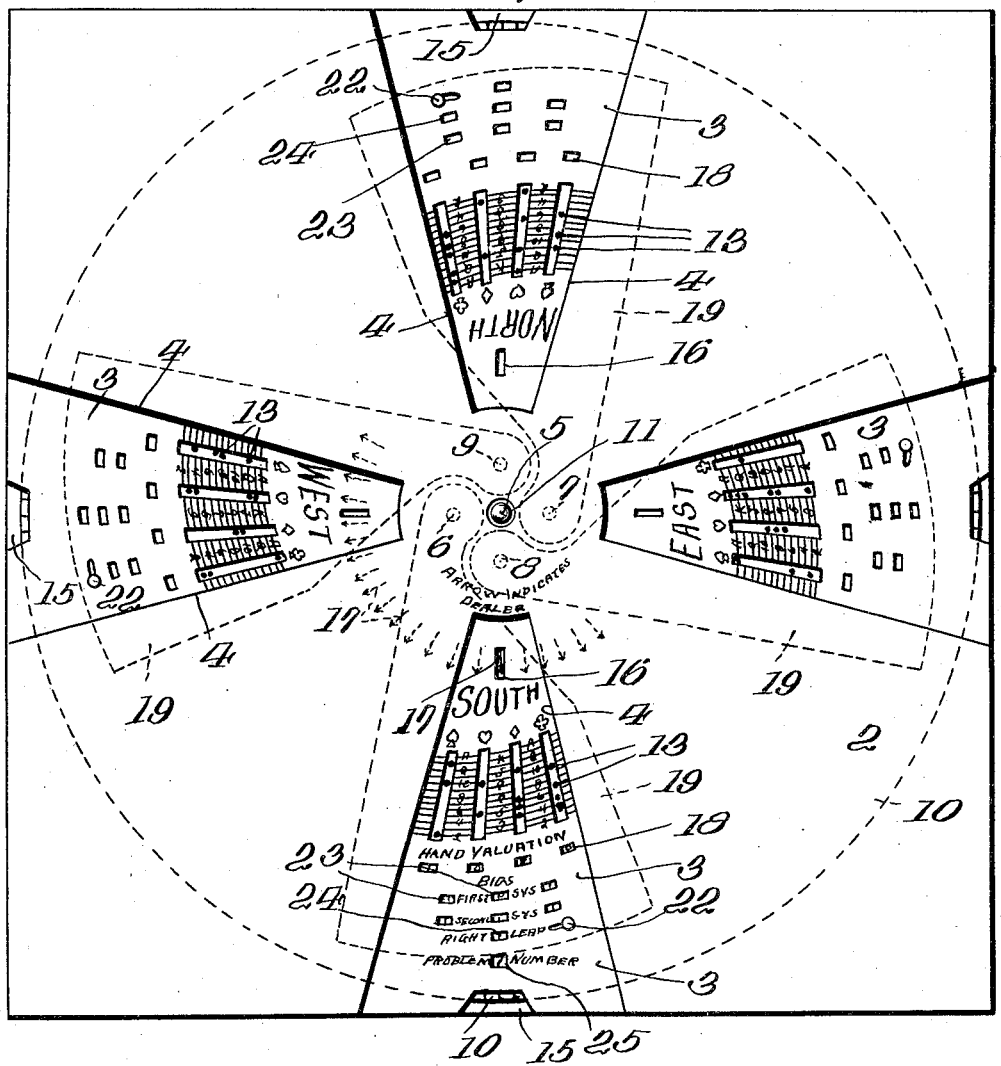
Figure 1 is a plan view of the device embodying the improvements.
Figure 2:
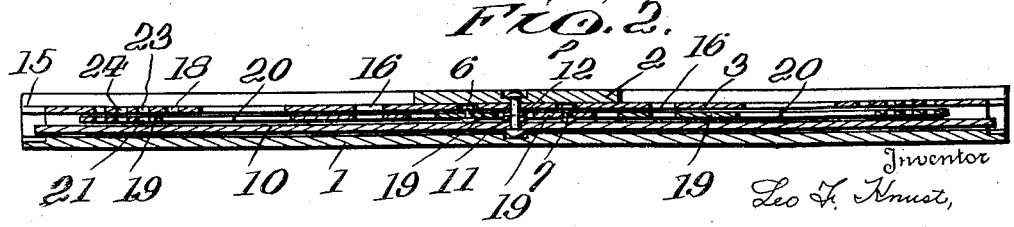
Fig. 2 is a sectional view on the line 2—2 of Fig. 1.

It is believed the device will be better understood by a detail description of the illustrated embodiment thereof. The device includes a supporting base 1 which is preferably rectangular. Mounted on this base and spaced therefrom is a table top 2 which will be referred to hereinafter as the table. Beneath the table is a plate 3, and the table is cut away along the lines 4, 4 so as to expose to view the plate which is attached to the under side of the table. Between the lines 4, 4 is the player's field, and as shown in Fig. 1 of the drawings, these fields are labeled North, South, East and West, as the device is particularly adapted for instructions in the playing of contract bridge.

The table 2 at each playing field is provided with four slots which are preferably disposed radially relative to the center of the table which is indicated at 5. These slots are for the purpose of exposing to view the cards in the several suits, and associated with each slot is a symbol indicating the card suit. At the left is the symbol of the spade suit, adjacent thereto is the heart suit, and then the diamond suit, and at the right is the club suit. Also drawn on the plate 3 of the table 2 are circular lines, the center of which is at one side of the center of the board. At the South field, the center of the arcuate lines is at 6. At the North, East and West fields, the centers are at 7, 8 and 9, respectively. Also appearing on the plate 3 for indicating the lines are symbols representing the cards in each suit from the ace to the two-spot. These symbols are only necessary in order to make it clear that the lines are for the purpose of indicating a card of a certain value. Other means may be used for this purpose. Mounted between the table and base 1 is a rotatable disk 10. The disk 10 is mounted on a pivot 11 secured to the table top, and is preferably spaced away from the table top by a washer 12. The disk has formed thereon dots, which, when brought to view in the respective slots, indicate cards in the suit. As shown in Fig. 3, these dots are indicated at 13.

Some of the dots, it will be noted, are in the form of circles, and the others are solid. They are all the same on the disk, but the solid dots indicate those which are positioned so that they would be viewed from the slots. For example, in the South field, in the slot indicating the spade suit, there are three dots which are solid. These dots, when exposed to view, are on the arcuate lines which pass centrally therethrough, and therefore, the dot at the upper end of the spade suit slot, indicates the king, while the next dot beneath indicates the ten of spades, and the lowermost dot indicates the two-spot of spades. The cards in the heart suit are indicated by spots in a similar manner, and likewise in the diamond suit and in the club suit.

In the East field, the slots are indicated in broken lines, as the table is broken away to show the shutter and disk beneath the plate 3. The open circular dots are the ones which are concealed by the plate, while the solid dots are the ones which appear through the slot. When the plate is turned through one step, it brings the necessary line of open dots to view beneath the slot. This is true in each slot, and therefore, the turning of the disk exposes another hand. This simultaneously exposes a new hand at each playing field. When the disk is turned through another step, still another hand is exposed, until finally the dots which are exposed to view in the heart suit will be exposed to view in the slot indicating the spade suit. It will be noted, however, that inasmuch as the arcuate lines are eccentrically disposed relative to the center around which the disk turns, that the dot, which for example, indicates a ten of hearts, when viewed through the heart slot, will indicate a jack of spades when viewed at the slot of the spade suit. Likewise, the dot which indicates a jack of diamonds when viewed through the slot of the diamond suit, will indicate a king of spades when viewed through the slot of the spade suit. By this arrangement, when the disk is turned step by step, it brings to view a new hand at each playing field, notwithstanding the fact that the dots will be operated to indicate cards in each suit as the disk is moved. This enables a great number of card hands to be displayed on the disk. As shown in the drawings, the number of the hands is indicated by the circular row of figures 14, and there are one hundred and eighty hands of a different character on the disk. The disk is turned by the player engaging the edge of the disk through a slot or recess 15 formed in the base 1 and in the plate 3. The edge of the disk projects into the recess, and may be knurled, if desired, to facilitate the ready turning of the disk. These numbers in the circle 14 are the problem numbers, and may be properly indexed and any desired problem may be displayed for consideration at will.

There is a slot 16 through the plate 3 at each playing field, and on the disk are a series of arrows indicated at 17. These arrows are so disposed that when the arrow is exposed to view through one of the slots 16 in the playing field, the player at that field is the dealer. In other words, the player at the South field, as shown in Fig. 1, is the dealer, because the arrow 17 appears in register with the slot 16. All the rest of the slots 16 are clear.

In line with each slot is an opening 18 through the plate 3. On the disk associated with each suit in the hand to be displayed, is the value of the cards in that suit. When the dots are brought to view in the card suit slot, the symbol indicating the value of the hand in that suit is brought into register with the opening 18. For example, in the South field, there appears in the opening 18 with the spade suit slot, the numeral 1, indicating that the value of the cards in the spade suit is 1. There is at the same time, a zero value indicated for the cards in the heart suit, and also in the club suit, and the value of one-third of a point for the diamond suit.

Located directly beneath the plate 3 and above the disk 10 at each playing field is a shutter 19. This shutter 19 as shown in Fig. 3, has a relatively large opening 20 therethrough. It also has openings 21 which may be placed in register with the openings 18. Each shutter is independently shiftable and is moved by a pin 22 extending through a slot in the plate 3. When the shutter is in the position shown at the South field, the openings 21 through the shutter are in register with the openings 18, and therefore, the value of the hands is exposed to view. If the shutter is shifted to the left by moving the pin 22 to the left-hand end of the slot in the plate 3, it will close the openings 18. This enables a player to display a problem hand, value the cards, and note the values made for the cards in each suit, and then by shifting the shutter, expose to view the standard values which are placed on the disks. The shutter for the South field is pivoted to swing about the center 6, while the shutter for the East field swings about the center 8. This enables the shutters to all be placed in the same plane, and be moved independently.

Also in the plate 3 at each field may be formed openings 23 indicating bids that are to be made based on the value of the hand and the position of the player. This may be likewise closed by the shutter 19. An opening 24 may be made for indicating the right lead to be made, and this may be likewise closed by the shutter 19. An opening 25 through the plate is for exposing to view the problem number, and this opening is not controlled by the shutter.

It will be noted that the ends of the slots through which the hands are displayed terminate on a line parallel with the arcuate lines indicating the cards in the suit. If a dot is exposed to view so as to indicate the ace of hearts when it appears in line with the slot for the spade suit, it will be concealed. Likewise, the dot indicating the two of spades in the South field, when opposite any other suit slot was concealed from view by the plate. Otherwise, all of the dots in any one line will be exposed to view through a slot, and as has already been noted, these dots as they appear in the different card suit slots, will indicate a card of a different value.

In Fig. 4 of the drawings, there is indicated a hood, consisting of a base member 26, side members 27, 27 and an end member 28. The base member is shaped so that it fits within the recess forming the playing field, and therefore, the hood may be readily placed at the playing field, and the side and end members thereof will conceal the hand displayed from all of the players except the one at the playing field where the hood is placed.

The shutters preferably contact with the disk, and when the disk is turned in a clockwise direction for presenting to view a new hand, the shutter will be frictionally moved therewith so as to close the openings. After the player has studied his hand, valued the same and is ready to make the bid, the shutter may be shifted so as to expose to view the standard values and bids for comparison with the ones which the player has made. Thus the player soon learns to properly value the hand and the proper bid to be made thereon.

When the device is used by four players, then the hoods are placed so as to conceal the hands at the various playing fields, and when the bidding terminates in a contract, the hood will be removed to expose the dummy hand. In double-dummy, these hoods can be so placed that the two players cannot observe the two hands of the opponent. A playing clip indicated at 29 may be used for indicating plays, when desired. This clip will be placed over the exposed dot indicating a card, and when placed, will indicate that the card has been played. These playing clips may be removably attached to the plate in any suitable manner, as for example, they may be wedged into the slot in the plate through which the dots are exposed. In this way, the hands displayed may be played. The device, however, is primarily to be used as a means for instruction in bidding and valuing of the hand. It will be understood that other data in connection with the hands may be placed on the movable disk and brought to view through suitable openings. Not only the standard bids to be made may be indicated, but the plays which are to be made. Different systems of bidding may also be indicated, if desired.

While the device as illustrated, is particularly adapted for contract bridge, it will be understood that it may be used for other card games, in which case, the symbols could be changed to properly indicate the cards and the values that are to be placed thereon, and the bids to be made. I have illustrated merely one arrangement of the symbols for a specific card game, but the principle may be used not only in card games, but for instruction of any kind where a player or operator is to take certain facts and value the same. The facts will be portrayed on the movable disk, and associated therewith will be standard values which may be concealed and exposed to the player or operator as described above in detail in connection with the card game.

It is obvious that the structure of the device may be greatly changed without departing from the spirit of the invention as set forth in the appended claims.

Having thus described the invention, what I claim as new and desire to secure by Letters-Patent, is—

1. A device for displaying card hands comprising a display table having a group of slots therethrough, one for each card suit, said slots being disposed so that the longitudinal axes thereof substantially pass through the center of the table, a movable member beneath the table and rotatable about the center thereof and having symbols thereon disposed so as to indicate in the respective slots the cards held in each suit, said table having characters thereon associated with said slots and indicating the different cards in a suit, the characters at each slot indicating the card in a suit being disposed in a different relation to the center of the table than the symbols on the movable member whereby a symbol when shifted from one slot to another indicates a different card in a suit.

2. A device for displaying card hands comprising a display table having a group of slots therethrough, one for each card suit, said slots being disposed so that the longitudinal axes thereof substantially pass through the center of the table, a movable member beneath the table and rotatable about the center thereof and having symbols thereon disposed so as to indicate in the respective slots the cards held in each suit, said table having characters thereon associated with said slots and indicating the different cards in a suit, the characters at each slot indicating the card in a suit being disposed in a different relation to the center of the table than the symbols on the movable member whereby a symbol when shifted from one slot to another indicates a different card in a suit, said table having an opening therethrough in line with and spaced from each slot, and a symbol carried by the movable member for indicating through the opening the standard value of the suit displayed in the slot with which said opening is associated.

3. A device for displaying card hands comprising a display table having a group of slots therethrough, one for each card suit, said slots being disposed so that the longitudinal axes thereof substantially pass through the center of the table, a movable member beneath the table and rotatable about the center thereof and having symbols thereon disposed so as to indicate in the respective slots the cards held in each suit, said table having characters thereon associated with said slots and indicating the different cards in a suit, the characters at each slot indicating the card in a suit being disposed in a different relation to the center of the table than the symbols on the movable member whereby a symbol when shifted from one slot to another indicates a different card in a suit, and means movable independently of the movable member for covering the openings and temporarily concealing the symbols appearing therethrough.

4. A device for displaying four card hands for instructing in valuing and bidding comprising a display table having a group of slots therethrough at each playing field, each group containing a slot for each card suit, said slots being disposed so that the longitudinal axes of all the slots pass substantially through the center of the table, a movable member beneath the table and rotatable about the center thereof, said movable member having symbols thereon disposed so as to appear first in one slot and then another in one field, and then in one slot and then another of another field for indicating in the respective slot where they appear, the card held in a suit, said table having characters associated with each slot and indicating the different cards in a suit, the characters at each slot in a group indicating the same card in a suit being disposed in a different relation to the center of the table than the symbols on the movable member whereby the symbol when shifted from one slot to another in any group, indicates a different card in a suit.

5. A device for displaying four card hands for instructing in valuing and bidding comprising a display table having a group of slots therethrough at each playing field, each group containing a slot for each card suit, said slots being disposed so that the longitudinal axes of all the slots pass substantially through the center of the table, a movable member beneath the table and rotatable about the center thereof, said movable member having symbols thereon disposed so as to appear first in one slot and then another in one field, and then in one slot and then another of another field for indicating in the respective slot where they appear, the card held in a suit, said table having characters associated with each slot and indicating the different cards in a suit, the characters at each slot in a group indicating the same card in a suit being disposed in a different relation to the center of the table than the symbols on the movable member whereby the symbol when shifted from one slot to another in any group, indicated a different card in a suit, said table having an opening therethrough in line with and spaced from each slot, and a symbol carried by the movable member for indicating through the opening the standard value of the suit displayed in the slot with which said opening is associated.

6. A device for displaying four card hands for instructing in valuing and bidding comprising a display table having a group of slots therethrough at each playing field, each group containing a slot for each card suit, said slots being disposed so that the longitudinal axes of all the slots pass substantially through the center of the table, a movable member beneath the table and rotatable about the center thereof, said movable member having symbols thereon disposed so as to appear first in one slot and then another in one field, and then in one slot and then another of another field for indicating in the respective slot where they appear, the card held in a suit, said table having characters associated with each slot and indicating the different cards in a suit, the characters at each slot in a group indicating the same card in a suit being disposed in a different relation to the center of the table than the symbols on the movable member whereby the symbol when shifted from one slot to another in any group, indicated a different card in a suit, said table having an opening therethrough in line with and spaced from each slot, a symbol carried by the movable member for indicating through the opening the standard value of the suit displayed in the slot with which said opening is associated, means associated with each group of slots and movable independently of the movable member for covering the openings and temporarily concealing the symbols appearing therethrough.

7. A device for displaying four card hands for instructing in valuing and bidding comprising a display table having a group of slots therethrough at each playing field, each group containing a slot for each card suit, said slots being disposed so that the longitudinal axes of all the slots pass substantially through the center of the table, a movable member beneath the table and rotatable about the center thereof, said movable member having symbols thereon disposed so as to appear first in one slot and then another in one field, and then in one slot and then another of another field for indicating in the respective slot where they appear, the card held in a suit, said table having characters associated with each slot and indicating the different cards in a suit, the characters at each slot in a group indicating the same card in a suit being disposed in a different relation to the center of the table than the symbols on the movable member whereby the symbol when shifted from one slot to another in any group, indicates a different card in a suit, a removable clip adapted to be attached to said table for indicating that a card has been played, and a hood detachably connected to the table for concealing the cards at each field from the view of the other players.

LEO F. KNUST.